Aug. 26, 1969      W. H. ASHLEY, JR      3,463,983
METHOD AND APPARATUS FOR REMOTELY SELECTIVELY CONTROLLING
ELECTRICAL DEVICES OPERATING FROM A COMMON SOURCE
Filed Jan. 19, 1967

INVENTOR
William H. Ashley Jr.

BY
Hovey, Schmidt, Johnson & Hovey
ATTORNEYS.

United States Patent Office 3,463,983
Patented Aug. 26, 1969

3,463,983
**METHOD AND APPARATUS FOR REMOTELY SE-
LECTIVELY CONTROLLING ELECTRICAL DE-
VICES OPERATING FROM A COMMON SOURCE**
William H. Ashley, Jr., Kansas City, Mo., assignor to
Frank E. Baum, Kansas City, Mo.
Filed Jan. 19, 1967, Ser. No. 610,310
Int. Cl. H02p 1/54
U.S. Cl. 318—103          20 Claims

ABSTRACT OF THE DISCLOSURE

The speed and direction of movement of each of a plurality of direct current operated model electric trains is independently remotely controlled by selectively superimposing oscillatory control signals upon an alternating operating potential applied to the track. Each control signal is of a different frequency and two signals are utilized in the control of each train, one corresponding to movement in the forward direction and the other corresponding to rearward movement. Frequency discriminating control circuitry in each train detects the presence of a particular signal and delivers either the positive or the negative component of the operating potential to the train motor, the amplitude of the control signal determining the amount of power available for motor operation.

---

The primary object of the instant invention is to provide a method and apparatus for independently controlling the operation of a plurality of electrically operated devices which derive power from the same source of electrical energy without utilizing any electrical connections to the devices other than those which must necessarily exist to transmit power from a common source to each device. Thus, the invention has particular application in the remote control of electrical equipment such as model electric trains where the number of connections to each train is necessarily limited by the number of rails provided.

As a corollary to the foregoing object, it is an important aim of this invention to independently control electrically operated devices through the use of control signals of different frequencies superimposed upon the operating potential for the devices. Hence, another important object is to provide frequency discriminating circuitry for each device capable of controlling the operation thereof in accordance with a control signal of particular frequency such that, in the case of a direct current operated device, both the polarity of the operating potential applied to the device and the amount of power from the source made available thereto are dependent upon the detection of the presence of a particular control signal by the circuitry and the amplitude of such detected signal.

Another object is to provide frequency discriminating circuitry as aforesaid which will respond to changes in amplitude of a detected control signal caused by the operator of the system at the remote control location in a manner to effect a corresponding, desired change in the amount of power available from the source for operation of the device without inducing undesired variations in system response so that the power to be applied to each device is exclusively under the control of the operator and not dependent on other system functions.

Figure 1:
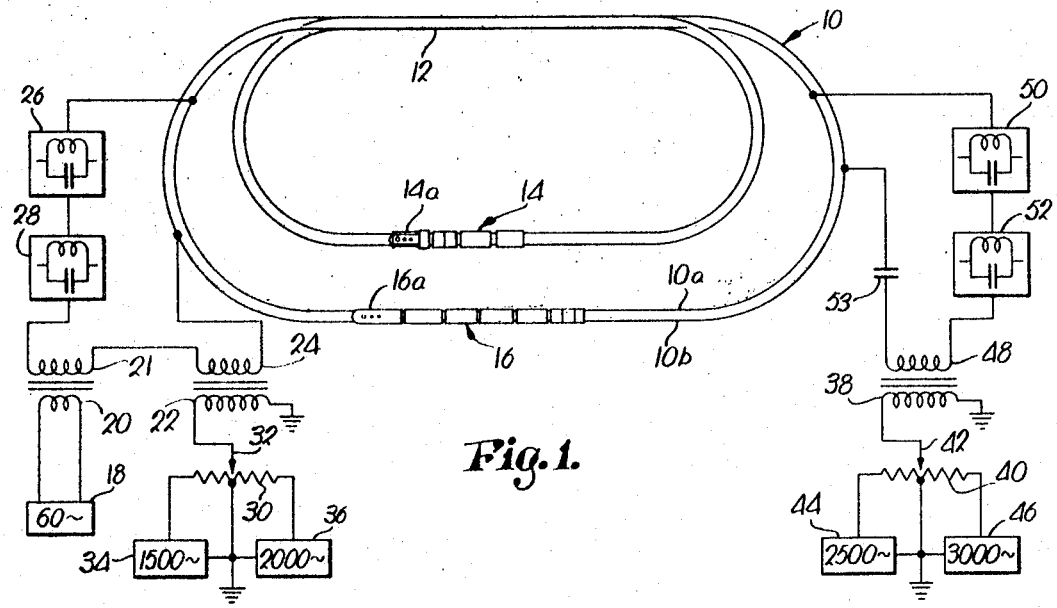
FIGURE 1 is a diagrammatic and schematic illustration of a model train control system embodying the teachings of the instant invention.

Referring initially to FIG. 1, a 2-rail model train track 10 is illustrated of double oval configuration having a common track stretch 12. A pair of electrical trains 14 and 16 are shown traveling on each oval, train 14 having an engine 14a and train 16 having an engine designated 16a. A pair of track switches (not shown) would be provided at the intersections of the two ovals at the ends of common stretch 12 under the control of the operator. Manifestly, a relatively simple train and track system is illustrated in FIG. 1, more elaborate multiloop arrangements having a number of trains traveling thereon being commonly utilized by model electric train enthusiasts. It will be appreciated hereinafter that the instant invention provides model train control to the same degree as in the control of full scale trains where each train is under the independent control of an engineer, unlike prior art, multi-block model train control systems in which sequential control of the trains of the system is employed. It should be understood, however, that the description of the invention to follow with respect to the control of trains 14 and 16 is presented as illustrative of one particular application of the teachings of the invention, as it will be readily appreciated that such teachings are also applicable to other electrical systems wherein the remote control of a plurality of electrically operated devices powered by a common source of electrical energy is to be effected.

The two rails 10a and 10b of the track 10 are electrically isolated from each other in order to provide a means of transmitting power to the electric motor in engines 14a and 16a. Operating potential for the motors is supplied by a conventional 60 Hz. source 18 coupled with the primary winding 20 of a transformer having a secondary winding 21. Since the potential supplied by source 18 would normally be 115 v. A.C., a step-down transformer would usually be employed to reduce the 60 Hz. potential to approximately 20 volts at the transformer secondary. A second transformer has a primary winding 22 and a secondary winding 24, the latter being connected in series with winding 21 and rail 10b of track 10. Winding 21 is connected to rail 10a through a pair of serially connected isolator circuits 26 and 28 to be discussed hereinafter.

A potentiometer in the form of a center tap resistor 30 contacted by a wiper 32 is adjustable by the operator to control both the speed and the direction of movement of one of the two trains. A pair of oscillators 34 and 36 each have one output terminal connected to the center tap of resistor 30 and the other output terminal connected to a corresponding end of resistor 30. The common connection of the oscillators and the center tap is connected to one end of primary winding 22 is indicated by the ground symbols, the other end of winding 22 being connected to wiper 32. Thus, with the wiper in the position illustrated in contact with the center tap, no potential difference appears across winding 22. Leftward movement of wiper 32, however, causes the signal from oscillaltor 34 to be impressed across winding 22, such signal being of progressively greater amplitude as the position of wiper 32 approaches the left end of resistor 30. The same is true with respect to oscillator 36 when wiper 32 is shifted to the right from the center tap position. Therefore, the operator at his option may select either the signal from oscillator 34 or 36 and may also control the amplitude of the selected signal at will.

The signal produced by oscillator 34 will be assumed to have a frequency of 1500 Hz., while the output signal from oscillator 36 will be assumed to be of a frequency of 2000 Hz. The values of these frequencies are unimportant except for the fact that a frequency difference must exist between the two output signals sufficient to permit a tuned circuit to readily discriminate between the two signals. Normally, frequencies in the audio range would be selected for convenience.

A similar arrangement is shown connected to the right-hand end of track 10 except that a single transformer having a primary 38 and a secondary 48 is utilized since the 60 Hz. potential for operating the train motors is applied to the track by the transformer discussed above. Here again, a potentiometer having a center tap resistor 40 contacted by a wiper 42 receives the output signals generated by a 2500 Hz. oscillator 44 and a 3000 Hz. oscillator 46, movement of wiper 42 to either side of the center tap position shown being effective to impress either one or the other of the output signals from oscillators 44 and 46 across winding 38 at a selected amplitude. The signal is coupled to the track 10 by the transformer secondary 48 through a pair of series connected isolation circuits 50 and 52 and a series capacitor 53.

For purposes of illustration it will be assumed that the motor of train engine 14a is responsive to the control signals of 1500 Hz. and 2000 Hz. produced by oscillators 34 and 36 and that, therefore, the motor of engine 16a is responsive to the 2500 Hz. and 3000 Hz. control signals produced by oscillators 44 and 46. Control of the motor of each engine is achieved by frequency discriminating circuitry which is housed within the engine and electrically interposed between the two rails of the track and the train motor. To avoid undesired loading effects, isolator circuits 26 and 28 comprise parallel, resonant networks tuned to 2500 and 3000 Hz. respectively, and isolator circuits 50 and 52 comprise networks which are parallel resonant at 1500 Hz. and 2000 Hz. Thus, the circuit of transformer secondary 24 presents a high impedance to the 2500 and 3000 Hz. control signals, and the circuit of transformer secondary 48 presents a high impedance to the 1500 and 2000 Hz. control signals.

Figure 2:
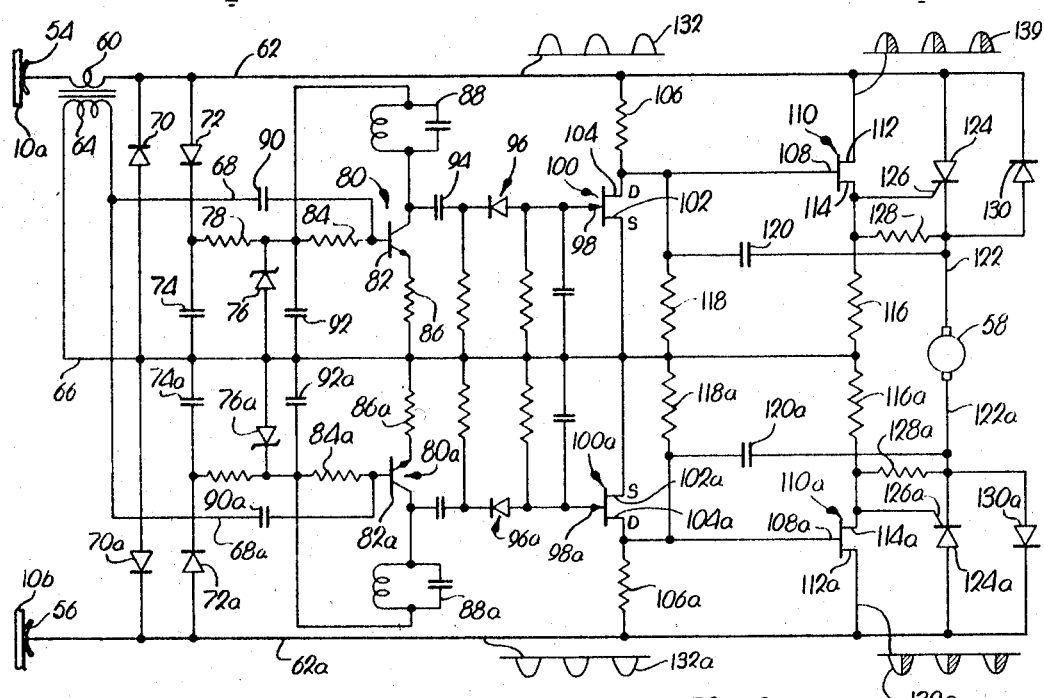
FIG. 2 is a schematic diagram of the frequency discriminating control circuitry carried in each train.

FIGURE 2 illustrates the circuitry within one of the engines 14a and 16a. Contact is made with the two rails 10a and 10b by conventional means, such as through the wheels of the engine or by a pair of sliding contacts 54 and 56 in engagement with the rails. Since the control signals and the 60 Hz. potential are all impressed across rails 10a and 10b, it will be appreciated that a composite potential is available at the rails which comprises the 60 Hz. potential with the selected control signals superimposed thereon. The potential of the control signals may be considerably less than the 60 Hz. operating potential, voltages on the order of 5 volts or less being sufficient for the control signals. The engine is driven by a permanent magnet, DC motor; thus, it is evident that the circuitry of FIG. 2 must be capable of delivering either the positive or the negative components of the 60 Hz. potential to motor 58 and, additionally, be capable of controlling the average voltage across the motor to govern the speed thereof in either of two opposite directions.

A step-up transformer has its primary winding 60 connected in series with contact 54 and a lead 62, the secondary winding 64 of the transformer having one of its ends connected to a common lead 66. The other end of winding 64 is connected to a pair of leads 68 and 68a which extend to the inputs of a pair of control circuits which operate in identical fashion but control opposite polarity components of the 60 Hz. potential. Therefore, only one of such circuits will be described in detail herein; corresponding components of the other circuit are designated by like reference numerals but with the addition of the "a" notation.

A pair of diodes 70 and 72 interconnect leads 62 and 66, diode 72 being connected in series with a bypass condenser 74. The two diodes 70 and 72 are oppositely poled and, in conjunction with diodes 70a and 72a, serve to conduct the components of the composite signal between contacts 54 and 56 via the transformer primary 60. Manifestly, the positive half cycles of the 60 Hz. potential and the control signals appearing across contacts 54 and 56 are conducted between leads 62 and 62a via diode 72, condenser 74, and diode 70a; conversely, negative half cycles are conducted by diode 72a, condenser 74a, and diode 70.

A Zener diode 76 is connected in series with a ballast resistor 78, the series combination being connected between the cathode of diode 72 and common lead 66. Zener diode 76 serves as a bias supply for a tuned amplifier stage 80 which utilizes a NPN transistor 82 having its base interconnected with the cathode of Zener 76 by an input coupling resistor 84. An emitter resistor 86 also forms a part of the bias circuitry for transistor 82 and is connected between the emitter thereof and common lead 66. A high Q, resonant output tank 88 is coupled between the collector of transistor 82 and the cathode of Zener 76 to complete the stage configuration. The AC input is applied to the base of the transistor by lead 68, the latter having a capacitor 90 interposed in series therewith which, in conjunction with capacitor 90a, minimizes cross channel input loading. A capacitor 92 is connected in parallel with Zener 76 as an AC bypass and also serves to minimize the ripple in the bias supply for transistor 82.

A coupling capacitor 94 connects the collector of transistor 82 to a rectifier and filter network 96. This network feeds the gate 98 of a field effect transistor 100, the source terminal 102 thereof being connected to common lead 66. The drain terminal 104 of transistor 100 is connected to lead 62 by a resistor 106, the latter and the source-drain circuit of transistor 100 thus forming a voltage divider across leads 62 and 66. The output of the divider is taken at drain terminal 104 and is directly connected to the emitter 108 of a unijunction transistor 110. The base-two terminal 112 of transistor 110 is connected to lead 62, the base-one terminal 114 thereof being connected to common lead 66 through a resistor 116. Resistor 118 is a bias resistor for the emitter of transistor 110.

A phase control condenser 120 connects emitter 108 with a lead 122 extending from one of the power input terminals of DC motor 58, condenser 120 serving to aid in positioning the range of control to that desirable for driving motor 58. A silicon controlled rectifier 124 has its cathode-anode circuit connected in series between leads 62 and 122, the gate 126 of SCR 124 being directly connected to base-one of transistor 110. A resistor 128 interconnects the base-one terminal 114 and lead 122 for the purpose of precluding insipient conduction of SCR 124 by preventing high voltage from appearing between the cathode and the gate 126 of SCR 124. A diode 130, poled oppositely with respect to the cathode-anode circuit of SCR 124, is connected in parallel with such circuit and cooperates with the SCR 124a, as will become clear hereinafter.

Since FIG. 2 illustrates the control circuit for engine 14a, output tank 88 has a resonant frequency of 1500 Hz. while tank 88a has a resonant frequency of 2000 Hz. Thus, when the 1500 Hz. control signal is applied to track 10, the 1500 Hz. section of the circuitry described in detail above responds to effect the desired control function. Conversely, application of the 2000 Hz. control signal to track 10 causes the 2000 Hz. section of the circuitry connected between leads 62a and 66 to respond.

OPERATION

It should first be noted that, as the trains 14 and 16 travel along track 10, each train will normally be remote from the control stations at opposite ends of the outside track loop. Thus, for the most part, the trains must be controlled from a remote location; additionally, of course, the trains are moving, thereby compounding the problem of making control connections thereto. The instant invention, therefore, provides a method and apparatus for transmitting a composite, power and control signal from a location normally remote from each train to a zone or region adjacent the train where the composite signal is picked up and utilized in the control and operation of the train motor. It will be appreciated that the control and power connections to track 10 can be made anywhere along the track, the illustration of FIG. 1 serving wholly as an example to illustrate the diversity of the system.

It will be assumed that it is desired that both trains 14 and 16 move in forward directions and that the motor 58 of each train drives the latter forward when energized by a positive potential, i.e., positive current flow through the motor from lead 122 to lead 122a. Wipers 32 and 42 are shifted leftwardly from the positions shown to impress the 1500 Hz. and the 2500 Hz. control signals across rails 10a and 10b, it being further assumed that tank 88 of the control circuitry in engine 16a has a resonant frequency of 2500 Hz.

Referring to FIG. 2, it will be seen that the composite signal appearing at transformer secondary 64 is fed to the base of transistor 82 by lead 68, thereby introducing the signal to the emitter-base junction of the transistor. Since output tank 88 is tuned to 1500 Hz. the amplifier effectively rejects the 60 Hz. signal and delivers an output to the rectifier and filter network 96 which is essentially a 1500 Hz. signal. Half wave rectification is effected in network 96, the rectifier being poled to deliver only the negative component of the 1500 Hz. signal fed thereto, which is filtered to reduce the ripple factor and delivered to the gate 98 of field effect transistor 100. Thus, transistor 100 is rendered responsive to a direct, negative potential at its gate 98, with the result that the impedance between source 102 and drain 104 is dependent upon the level of the incoming voltage at gate 98.

A wave form 132 illustrates the positive, half sinusoidal components of the 60 Hz. potential available at lead 62. The negative components of the 60 Hz. potential are illustrated by wave form graph 132a associated with lead 62a. These two graphs in combination depict the 60 Hz. potential available across leads 62 and 62a for the purpose of supplying power to motor 58; the higher frequency control signals are omitted from the showing since they are short circuited between leads 62 and 62a.

Due to the voltage divider formed by transistor 100 and resistor 106, the 60 Hz. potential level at drain terminal 104 is dependent upon the impedance presented between drain 104 and lead 66. This voltage level, controlled by the output of amplifier stage 80, appears at the emitter 108 of unijunction transistor 110 and, when such voltage reaches the gating level of transistor 110, the latter rapidly goes into hard conduction to, in turn, gate SCR 124.

Figure 3:
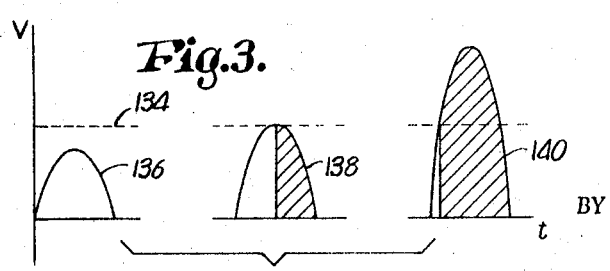
FIG. 3 is a wave form graph illustrating the operation of the circuitry in controlling the speed of the train drive motor.

The foregoing action of transistor 110 is depicted in FIG. 3 where three levels of 60 Hz. potential appearing at emitter 108 are shown. The gating level of transistor 110 is represented by the broken line 134. Wave form 136 shows the potential when the impedance of the field effect transistor 100 is relatively low, corresponding to a relatively low, negative voltage output from network 96. Under this condition transistor 110 will not fire and SCR 124 remains off.

The second wave form 138 depicts the minimum voltage at emitter 108 which will cause conduction of transistor 100. Once gated, transistor 110 remains in conduction until the 60 Hz. potential swings negative. Thus, the area of wave form 138 indicated by the shading represents the total conduction time of transistor 110 during each cycle of the 60 Hz. potential. This conduction time also corresponds to the conduction time of SCR 124. Therefore, power is made available to motor 58 during this portion of each cycle (as illustrated by wave form graph 139 in FIG. 2) via a current path through SCR 124, lead 122, motor 58, lead 122a, and diode 130a. The condition illustrated by wave form 138 corresponds to operation of the train at its slowest speed, power being available for operation of motor 58 only during one-fourth of each cycle of the 60 Hz. power. Higher frequency power sources may be used to increase the energy input to the motor per unit time if desired in particular applications, such as by interposing a converter between the 115 v. A.C. source and the system power input.

As the impedance across terminals 102 and 104 of transistor 100 increases by the delivery of a progressively more negative input signal to gate 98, the 60 Hz. potential at emitter 108 increases, as illustrated by wave form 140. Although the gating level of transistor 110 is constant, it will be noted that the potential at emitter 108 reaches gating level 134 sooner during each cycle, thereby increasing the time duration during each cycle in which transistor 110, and hence SCR 124, is in conduction. In this manner, the speed of the train is controlled by the operator since adjustment of wiper 32 to the left side of the center tap of resistor 30 changes the level of the 1500 Hz. control signal to, in turn, make a corresponding change in the negative potential applied to the gate 98 of the field effect transistor 100. In like fashion, the forward speed of train 16 is controlled by the leftward displacement of wiper 42, which determines the amplitude of the 2500 Hz. control signal applied to the track.

Operation of the circuitry in each train is the same as above for the reverse direction, except that the 2000 Hz. and 3000 Hz. sections of the two control circuitries in engines 14a and 16a now respond to 2000 Hz. and 3000 Hz. control signals applied to the track by movement of wipers 32 and 42 rightwardly of the positions illustrated. Manifestly, one train may be operated in the forward direction, while the other train is moving in reverse, and the speeds of the two trains may be independently controlled. Furthermore, by adding additional control stations similar to the station shown in FIG. 1 connected to the right end of the track, any number of trains may be controlled through the use of additional control signal frequencies and tuned tanks in the engines corresponding to such additional frequencies.

With regard to the control circuitry, the use of field effect transistors 100 and 100a is significant in that a field effect transistor has a high input impedance, substantially higher than the output impedance of amplifier stage 80 or 80a. Since the output impedance of each tuned amplifier is increased by the parallel resonant tank, it is necessary to provide a component in the succeeding portion of the circuitry which is capable of presenting an input impedance of still higher value in order to provide a ratio of input impedance to output impedance which is sufficiently high to preclude variations in the current drawn from the tuned amplifier output from noticeably affecting the Q of the tank. If the value of the Q were allowed to be reduced by the loading of the succeeding portion of the circuitry, the response of the tuned amplifier would necessarily change. Manifestly, it is desired that the output signal of the amplifier be subject only to the control of the train operator. For this reason, in the instant invention, a relatively high impedance load (the field effect transistor) is driven by a relatively low impedance source (the tuned amplifier) in order to minimize the effect of the load on the Q of the resonant tank.

Having thus described the invention, what is claimed as new and desired to be secured by Letters Patent is:

1. A method of remotely controlling the operating polarity of a direct current-operated electrical device independently of other electrical equipment operating from the same source, said method comprising the steps of:

deriving from said source an alternating potential of predetermined frequency having a pair of components of opposite polarity;

at a location normally remote from said device, selectively delivering either a first or a second oscillatory control signal, each having a different frequency other than said predetermined frequency;

transmitting said potential and the delivered control signal to a zone proximate said device;

detecting the presence of the transmitted control signal in said zone and identifying the detected signal according to the frequency thereof; and thereafter applying one of said components to said device when said first signal is identified in said zone, and the other of said components to said device when said second signal is identified in said zone.

2. The invention of claim 1, wherein said method comprises the additional step of:

at a location normally remote from said device, superimposing the delivered control signal upon said potential to combine the same prior to said transmitting of the potential and the delivered signal to said zone.

3. The invention of claim 1, said step of selectively delivering said control signals including providing the delivered signal with a selectively variable amplitude, said component applying step including supplying either of the components to said device in a manner to cause the amount of power from said source available for operation of the device to be dependent upon the amplitude of the delivered control signal.

4. The invention of claim 1, wherein said equipment includes a second direct current operated electrical device, said method comprising the additional steps of:

at a location normally remote from said second device, selectively delivering either a third or a fourth oscillatory control signal, each having a different frequency other than said predetermined frequency and the frequencies of said first and second signals;

transmitting said potential and the delivered third or fourth signal to a region proximate said second device;

detecting the presence of the transmitted signal in said region and identifying the detected signal according to its frequency; and thereafter applying said one component to said second device when said third signal is identified in said region, and said other component to said second device when said fourth signal is identified in said region.

5. The invention of claim 4, wherein said method further comprises the step of:

superimposing the delivered control signals upon said potential to form a composite signal prior to said potential and control signal transmitting steps, said transmitting steps including conducting said composit signal to said zone and said region.

6. A method of remotely controlling the delivery of an oscillatory, periodic operating potential of constant frequency to an electrical device independently of other electrical equipment operated by the same source of said potential, said method comprising the steps of:

at a location normally remote from said device, providing an oscillatory control signal of a different, predetermined frequency having a selectively variable amplitude;

transmitting said potential and said signal to a zone proximate said device;

detecting the presence of said signal in said zone; and thereafter applying said potential to said device only during a portion of each period of said potential having a duration governed by the amplitude of said detected signal to thereby cause the amount of power from said source available for operation of the device to be dependent upon the amplitude of the detected signal.

7. The invention of claim 6, wherein said method comprises the additional step of:

at a location normally remote from said device, superimposing said signal upon said potential to combine the same prior to said transmitting of the potential and signal to said zone.

8. The invention of claim 6, wherein said equipment includes a second electrical device, said method comprising the additional steps of:

at a location normally remote from said second device, providing a second oscillatory signal having a selectively variable amplitude and a frequency different from said predetermined frequency and the operating potential frequency;

transmitting said potential and said second signal to a region proximate said second device;

detecting the presence of said second signal in said region; and thereafter applying said potential to said second device only during a portion of each period of said potential having a duration governed by the amplitude of the detected second signal to thereby cause the amount of power from said source available for operation of the second device to be dependent upon the amplitude of the detected second signal, whereby delivery of said potential to either of said devices is independently remotely controllable.

9. The invention of claim 8, wherein said method further comprises the step of:

superimposing said signals upon said potential to form a composite signal prior to said potential and firstmentioned control signal transmitting step and said potential and second control signal transmitting step, said transmitting steps including conducting said composite signal to said zone and said region.

10. A system for remotely controlling the operating polarity of a direct current operated electrical device independently of other electrical equipment operating from the same source of alternating potential, the latter being of predetermined frequency and having a pair of components of opposite polarity, said system comprising:

apparatus normally remote from said device for selectively producing either a first or a second oscillatory control signal, each having a different frequency other than said predetermined frequency;

conductive means coupled with the output of said apparatus and extending to a zone proximate said device;

means coupled with said conductive means and adapted for coupling with said source for delivering said alternating potential to said conductive means whereby the produced signal is superimposed upon said alternating potential to form a combined signal for transmission to said zone by said conductive means; and circuitry coupled with said conductive means at said zone and adapted to be coupled with said device for controlling delivery of said opposite polarity components to the device from said conductive means, said circuitry being frequency discriminating and responsive to said first signal for applying one of said components to said device, and responsive to said second signal for applying the other of said components to said device.

11. The invention in claim 10, said circuitry including a pair of electrically responsive, unidirectionally conductive switches for establishing a pair of oppositely directed current paths from said conductive means to said device, and a pair of switch operating circuits operably coupled with respective switches, each of said operating circuits having tuned circuit means therein exclusively responsive to a corresponding control signal for initiating the operating circuit to effect actuation of the corresponding switch.

12. The invention of claim 10,
said apparatus being provided with selectively operable means for varying the amplitude of the produced control signal,
said circuitry being responsive to the produced control signal for rendering the amount of power from said source available for operation of said device dependent upon the amplitude of the produced control signal.

13. The invention of claim 10,
said device being an electric motor operable in forward and reverse directions by respective components,
said conductive means comprising a track,
there being a vehicle on said track movable therealong and housing said circuitry,
said vehicle being powered by said motor and adapted to support the same for movement with the vehicle along the track.

14. The invention of claim 10, wherein said equipment includes a second direct current operated electrical device, said system further comprising:
a second apparatus normally remote from said second device for selectively producing either a third or a fourth oscillatory control signal, each having a different frequency other than said predetermined frequency and the frequencies of said first and second signals,
said conductive means being coupled with the output of said second apparatus and extending to a region proximate said second device, whereby the control signal provided by said second apparatus is also superimposed upon said potential to form a composite signal for transmission to said zone and said region by said conductive means; and
a second circuitry coupled with said conductive means at said region and adapted to be coupled with said second device for controlling delivery of said potential to the second device from said conductive means,
said second circuitry being frequency discriminating and responsive to said third signal for applying said one component to said second device, and responsive to said fourth signal for applying said other component to said second device.

15. A system for remotely controlling the operation of an electrical device independently of other electrical equipment operating from the same source of oscillatory, periodic electrical potential of constant frequency, said system comprising:
apparatus normally remote from said device for producing a control signal of a different, predetermined frequency, and provided with selectively operable means for varying the amplitude of said signal;
conductive means coupled with the output of said apparatus and extending to a zone proximate said device;
means for coupling said conductive means with said source to superimpose said signal upon said potential to form a combined signal for transmission to said zone by said conductive means; and
circuitry coupled with said conductive means at said zone and adapted to be coupled with said device for controlling delivery of said potential to the device from said conductive means,
said circuitry being frequency discriminating and including means responsive to said control signal for supplying said potential to said device only during a portion of each period of said potential having a duration governed by the amplitude of said control signal to thereby render the amount of power from said source available for operation of said device dependent upon the amplitude of said control signal.

16. The invention of claim 15,
said device being an electric motor,
said conductive means comprising a track,
there being a vehicle on said track movable therealong and housing said circuitry,
said vehicle being powered by said motor and adapted to support the same for movement with the vehicle along the track.

17. The invention of claim 15,
said potential supplying means including a tuned amplifier provided with an output tank having a resonant frequency equal to said predetermined frequency, a voltage divider having an electrically responsive, variable impedance element coupled with said tank whose impedance varies as a function of the output from said tank, electrically responsive switching means coupled with said element and adapted for series connection with said device, and means coupled with said divider and said switching means for applying half cycles of said potential of one polarity thereto,
said switching means having a normal, open circuit condition and being operable to establish a current path therethrough for energizing said device when the voltage across said element reaches a predetermined level.

18. The invention of claim 17,
said element being a field effect transistor having a gate,
said potential supplying means further including a rectifier and filter network intercoupling said tank and said gate.

19. The invention of claim 18,
said switching means including a silicon controlled rectifier having a control gate and a cathode-anode circuit normally interrupting said current path, and a unijunction transistor responsive to said voltage across the field effect transistor and coupled with said rectifier control gate for triggering the silicon controlled rectifier when said voltage reaches said level.

20. The invention of claim 15, wherein said equipment includes a second electrical device, said system further comprising:
a second apparatus normally remote from said second device for producing a second control signal having a frequency different from said predetermined frequency and the frequency of said potential, and provided with selectively operable means for varying the amplitude of said second signal,
said conductive means being coupled with the output of said second apparatus and extending to a region proximate said second device, whereby said second signal is also superimposed upon said potential to form a composite signal for transmission to said zone and said region by said conductive means; and
a second circuitry coupled with said conductive means at said region and adapted to be coupled with said second device for controlling delivery of said potential to the second device from said conductive means,
said second circuitry being frequency discriminating and including means responsive to said second control signal for supplying said potential to said second device only during a portion of each period of said potential having a duration governed by the amplitude of said second control signal to thereby render the amount of power from said source available for operation of said second device dependent upon the amplitude of said second control signal, whereby said second device may be remotely controlled independently of the first-mentioned device.

(References on following page)

References Cited

UNITED STATES PATENTS

| | | | |
|---|---|---|---|
| 2,858,773 | 11/1958 | Eldridge | 104—149 |
| 3,087,440 | 4/1963 | Zarnstorff | 104—152 |
| 3,195,029 | 7/1965 | Gilbreath | 318—331 X |
| 3,211,111 | 10/1965 | Morley | 104—151 X |
| 3,220,356 | 11/1965 | Leslie | 104—151 |
| 3,222,610 | 12/1965 | Evans et al. | 307—251 X |
| 3,361,082 | 1/1968 | Leslie | 104—151 |
| 3,392,352 | 7/1968 | White | 307—304 X |

ORIS L. RADER, Primary Examiner

A. G. COLLINS, Assistant Examiner

U.S. Cl. X.R

204—151; 307—38